July 27, 1943. H. BANY 2,325,361
CIRCUIT INTERRUPTER CONTROL SYSTEMS
Filed Aug. 2, 1941
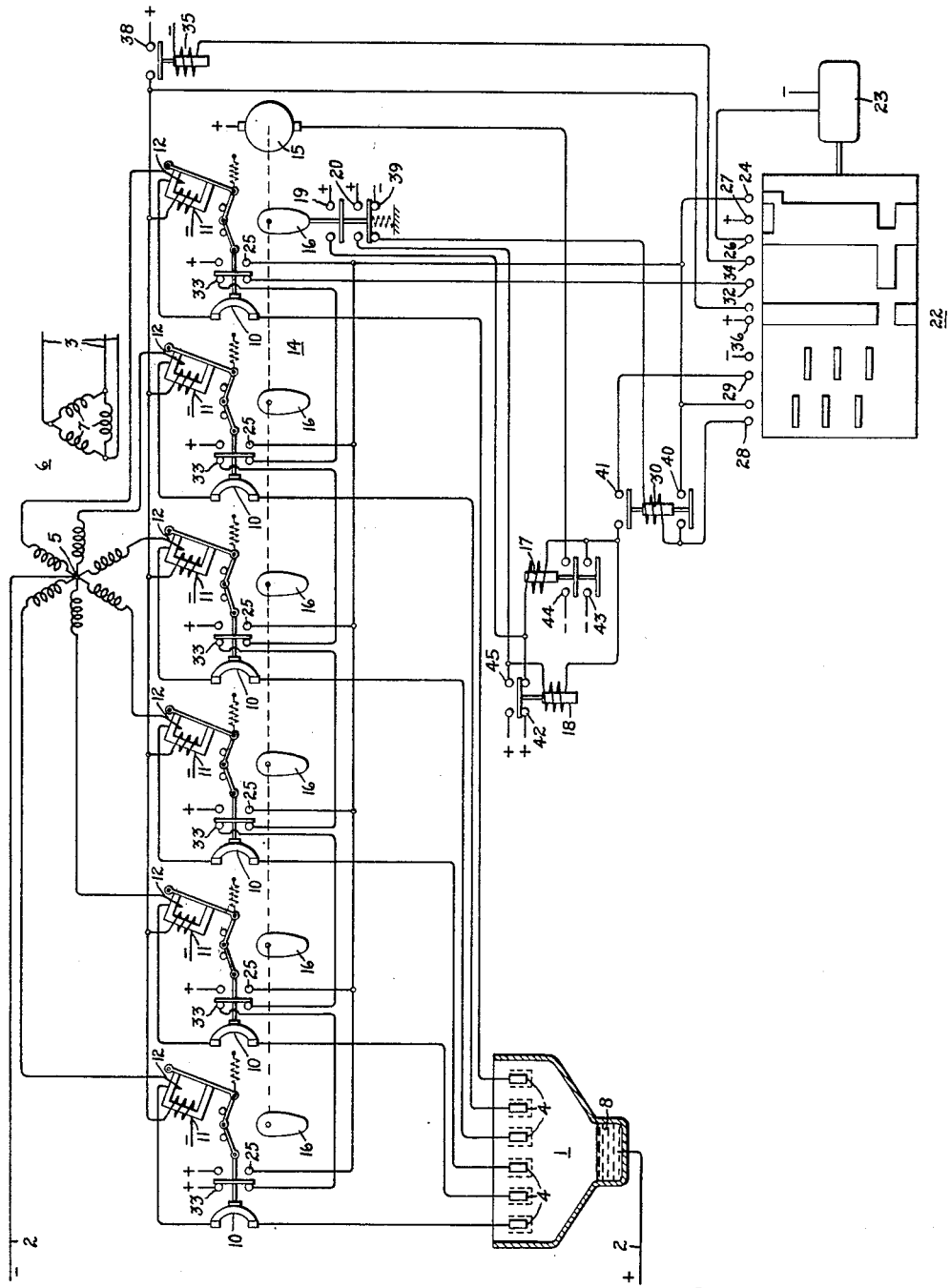
Inventor:
Herman Bany,
by Harry E. Durham
His Attorney.

Patented July 27, 1943

2,325,361

UNITED STATES PATENT OFFICE 2,325,361

CIRCUIT INTERRUPTER CONTROL SYSTEM

Herman Bany, Lansdowne, Pa., assignor to General Electric Company, a corporation of New York Application August 2, 1941, Serial No. 405,265

4 Claims. (Cl. 175—363)

My invention relates to circuit interrupter control systems and particularly to systems for controlling the operation of circuit interrupters in a plurality of rectifying circuits through which current is supplied from an alternating current supply circuit to a direct current load circuit. My invention is particularly adapted for use in connection with polyphase vapor rectifiers which are provided with a plurality of circuit interrupters respectively in series with the anode circuits of the rectifiers and with means for effecting the opening of a circuit interrupter upon the occurrence of an arc-back involving the associated anode.

One object of my invention is to provide an arrangement of apparatus for controlling the operation of a plurality of circuit interrupters in a plurality of rectifying circuits such as the anode circuits of a polyphase vapor rectifier so that, when an arc-back occurs, it is extinguished as quickly as possible, and then the faulty rectifying circuits are restored to their normal operating conditions after the arc-back has been extinguished.

In accordance with my invention, the circuit interrupters associated with the anodes involved in an arc-back are opened as quickly as possible while the circuit interrupters, in series with the other anodes, remain closed. The opened circuit interrupters are then automatically reclosed to restore normal operating conditions. However, if, after a predetermined number of reclosures, a circuit interrupter still fails to remain closed, all of the circuit interrupters in the other anode circuits are then opened to interrupt the supply of current through all of them in order not to overload the apparatus associated therewith.

My invention will be better understood from the following description when taken in connection with the accompanying drawing the single figure of which diagrammatically illustrates a circuit interrupter control system for a polyphase vapor rectifier, which embodies my invention, and the scope of my invention will be pointed out in the appended claims.

Referring to the drawing, I represents a polyphase vapor rectifier of any well known type for supplying direct current to a load circuit 2 from an alternating current supply circuit 3. As shown, the rectifier I has six anodes 4 which are connected respectively to the six terminals of a six-phase star connected secondary winding 5 of a transformer 6 the three-phase delta connected primary winding 7 of which is connected to the three-phase supply circuit 3. The negative side of the direct current load circuit 2 is connected to the neutral point of the secondary winding 5 of the transformer 6, and the positive side of the load circuit 2 is connected to the cathode 8 of the vapor rectifier I.

In series with each anode 4, I provide a separate circuit interrupter 10 which is arranged in any suitable manner so that it is quickly opened upon the occurrence of an arc-back involving the associated anode 4 of the rectifier I. As shown, each circuit interrupter 10 is of the well known type comprising a holding coil 11, which, when energized, magnetically holds the interrupter in its closed position against the bias of suitable opening means and a current coil 12, which is so located with respect to the holding coil 11 that, when the current flow through the current coil 12 exceeds a predetermined value in a predetermined direction, the magnetic holding effect of the associated holding coil 11 is decreased sufficiently to allow the circuit interrupter to open. In the particular arrangement shown in the drawing the coils 11 and 12 of each circuit interrupter 10 are so arranged that, when a power reversal occurs during an arc-back, the current in the current winding 12 is in the proper direction to decrease the holding effect produced by the associated holding winding 11. For closing the circuit interrupters 10, a common closing mechanism 14 is provided comprising a suitable motor 15 driving a separate operating means 16 (shown as a cam) for each circuit interrupter. An operating circuit for the motor 15 is arranged to be completed whenever an associated control relay 17 is energized. The motor 15 and the control relay 17 are normally de-energized. The energizing circuit of the control relay 17 is controlled by another control relay 18 and suitable off-normal contacts 19 and 20 which are closed whenever the motor 15 is out of its normal position. In this manner the motor 15, whenever its operation is effected, effects a complete rotation of all of the cams 16.

In accordance with my invention, I provide suitable automatic reclosing means for effecting the operation of the common closing motor 15 whenever any one of the circuit interrupters 10 opens so that the opened circuit interrupter is reclosed and for effecting a predetermined number of reclosures thereof in case the circuit interrupter fails to remain closed after each reclosure. Also means are provided for effecting the opening of all of the other circuit interrupters in case any of the circuit interrupters fails to remain closed after being reclosed a predetermined number of times.

In the particular arrangement shown in the drawing the automatic reclosing means comprises a timer 22 driven by a constant speed motor 23. When the timer 22 is in its normal position, it establishes a connection between a contact 24, which is connected to the normally opened parallel connected auxiliary contacts 25 on the circuit interrupters 10, and a contact 26, which is connected to the driving motor 23, so that the closing of any one of the auxiliary contacts 25 initiates the operation of the driving motor 23. As soon as the timer moves out of its normal position, it establishes a connection between the contact 26 and a contact 27 so that a locking circuit is completed for the motor 23.

The timer 22 is provided with two sets of contacts 28 and 29 which are arranged to be closed successively as the timer is rotated with predetermined time intervals between successive closures thereof. When the contacts 28 are closed, a circuit is completed for a control relay 30 if at the same time the motor 15 is in its normal position and one or more of the circuit interrupters 10 are open so that the auxiliary contacts 25 thereof are closed. The relay 30, when energized, completes a shunt circuit around the contacts 28 so that the relay 30 remains energized when these contacts 28 are subsequently opened by the timer. When the contacts 29 are closed and the relay 30 is energized, a circuit is completed for the control relay 17 to initiate the operation of the closing motor 15.

After the timer 22 has been in operation for a predetermined time and the contacts 28 and 29 have been closed a predetermined number of times, the timer 22 interrupts the connection between the contacts 26 and 27 in the energizing circuit of the driving motor 23 and establishes a connection between the contact 26 and a contact 32 which is connected to the series connected auxiliary contacts 33 of the circuit interrupters 10 so that, if all of the circuit interrupters are closed, an energizing circuit is then completed for the driving motor 23 to restore the timer 22 to its normal position. Also at the same time a connection is established between the contact 32 and a contact 34 which is connected to a control relay 35 so that this relay is also energized if all of the circuit interrupters 10 are closed. The relay 35, when energized, establishes an energizing circuit for all of the holding coils 11. Normally these holding coils 11 are energized through a set of contacts 36 which are connected together in all positions of the timer except in the lockout position thereof which is the position in which the contacts 26, 32 and 34 are connected together. Therefore, if any one of the circuit interrupters is open when the timer is in its lockout position, the holding coils 11 of all of the circuit interrupters 10 are opened to effect the opening of all of the other circuit interrupters.

The operation of the arrangement shown in the drawing is as follows:

Under normal operating conditions, all of the circuit interrupters 10 are closed so that each of the rectifying circuits through the rectifier 1 supplies direct current from the supply circuit 3 to the load circuit 2. The timer 22 is in its off position, which is the position in which it is shown. In this off position, the energizing circuits of the holding windings 11 of all of the circuit interrupters 10 are completed through the contacts 36 of the timer 22.

Whenever an arc-back occurs during the operation of the rectifier 1, a reverse current flows through the anode 4 involved in the arc-back, and this reverse current effects in a well known manner the opening of the circuit interrupter 10 through which the reverse current flows. The opening of the auxiliary contacts 25 of the opened circuit interrupter 10 completes an energizing circuit for the driving motor 23 through the contacts 26 and 27 of the timer 22 so that the timer 22 starts to rotate. As soon as the timer 22 leaves its normal position, it disconnects the contact 26 from the contact 24 and connects it to the contact 27 so that a holding circuit, which is independent of the contacts 25 of the circuit interrupters 10, is completed for the driving motor 23. After the timer 22 has been in operation for a predetermined time, it closes its contacts 28 and completes an energizing circuit for the control relay 30 through the auxiliary contacts 25 on the opened circuit interrupter 10 and the contacts 39 which are closed when the closing motor 15 is in its normal position. The closing of the contacts 40 of the relay 30 completes a shunt circuit around the contacts 28 of the timer 22. When the timer 22 subsequently closes its contacts 29, an energizing circuit is completed for the control relay 17 through the contacts 41 of the energized relay 30 and the contacts 42 of the control relay 18. The closing of the contacts 43 of the relay 17 completes a shunt circuit around the contacts 41 of the relay 30 and the contacts 29 of the timer 22, and the closing of the contacts 44 of the relay 17 completes an energizing circuit for the closing motor 15 so that the closing mechanism 14 is operated to reclose the open circuit interrupter 10. As soon as the closing motor 15 leaves its normal position, its auxiliary contacts 39 are opened and its auxiliary contacts 19 and 20 are closed. The opening of the contacts 19 interrupts the energizing circuit of the control relay 30 so that it becomes de-energized and cannot be energized again until the timer recloses its contacts 28. The closing of the contacts 19 completes a shunt circuit around the contacts 42 of the relay 18 in the energizing circuit of the control relay 17, and the closing of the contacts 20 completes an energizing circuit for the control relay 18 through the contacts 43 of the energizing control relay 17. The closing of the contacts 45 of the control relay 18 completes a shunt circuit around the contacts 20. When the closing motor 15 has completed the closing of the opened circuit interrupter, which operation is completed long before the timer 22 again closes its contacts 28, the auxiliary contacts 39 are reclosed and the auxiliary contacts 19 and 20 are opened. The opening of the contacts 19 interrupts the energizing circuit of the control relay 17 which, by opening its contacts 43, effects the subsequent de-energization of the control relay 18.

If a circuit interrupter 10 opens immediately after it is reclosed by the closing mechanism 14, the timer 22, by successively closing its contacts 28 and 29, again effects in the manner above described subsequent reclosures of the circuit interrupter at predetermined time intervals after each previous reclosure. If, however, the circuit interrupter remains closed after any reclosure, the subsequent closing of the contacts 28 and 29 of the timer 22 does not effect an operation of the closing mechanism 14 because the energizing circuit of the control relay 30 is open at the contacts 25 of the circuit interrupters 10.

After the timer 22 has effected a predetermined number of reclosures of a circuit interrupter 10, it moves to its lockout position in which it connects together its contacts 26, 32 and 34 and disconnects contact 27 from contact 26 and opens the circuit through the set of contacts 36. If all of the circuit interrupters 10 are closed when the timer 22 reaches its lockout position, a circuit is completed for the control relay 35 through the contacts 32 and 34 of the timer. The closing of the contacts 38 of the control relay 35 completes the energizing circuits for the holding coils 11 of the circuit interrupters 10 so that these holding coils are not de-energized by the timer opening its set of contacts 36 when it is in its lockout position. Also a circuit is completed for the driving motor 23 through the timer contacts 26 and 32 and the series connected contacts 33 of all of the circuit interrupters 10 so that the timer is moved out of its lockout position. As soon as the timer moves out of its lockout position, the contacts 36 are again closed to re-establish the energizing circuits for the holding coils 11, and the contacts 26 and 27 are again connected together so that the timer 22 is restored to its normal position.

If any one of the circuit interrupters 10 is open when the timer 22 reaches its lockout position, the series circuit through the contacts 33 of the circuit interrupters is open so that the above traced energizing circuit of the control relay 35 is not completed in the lockout position of the timer. Therefore, when the timer opens the circuit through its contacts 36, all of the holding coils 11 are de-energized so that all of the circuit interrupters 10 open to disconnect the rectifier 1 from the secondary winding 5 of the transformer 6. Also the operating circuit for effecting the operation of the driving motor 23 to move the timer 22 out of its lockout position is not completed.

Therefore, it will be seen that I have provided an arrangement which, in case of an arc-back, tries several times to re-establish service through the faulty rectifying circuit while maintaining service through the other rectifying circuits and interrupts all of the rectifying circuits in case service cannot be restored through the faulty rectifying circuit.

While I have, in accordance with the patent statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States is:

1. In combination, a vapor rectifier comprising a plurality of anodes, an individual circuit interrupter in series with each anode, and means responsive to a reversal of power through an anode for automatically opening and reclosing a predetermined number of times within a predetermined time interval the circuit interrupter in series with the anode through which the power reversal occurs and for opening all of the other circuit interrupters if the circuit interrupter in series with the anode through which the power reversal occurs is open at the expiration of said predetermined time interval.

2. In combination, a direct current circuit, an alternating current circuit, rectifying means supplying current from said alternating current circuit to said direct current circuit comprising a plurality of rectifying circuits, individual circuit interrupting means in each rectifying circuit, and means responsive to a reversal of power in a rectifying circuit for automatically opening and reclosing a predetermined number of times within a predetermined time interval the circuit interrupter in series with the anode through which the power reversal occurs and for opening all of the other circuit interrupters if the circuit interrupter in series with the anode through which the power reversal occurs is open at the expiration of said predetermined time interval.

3. In combination, a vapor rectifier comprising a plurality of anodes, an individual circuit interrupter in series with each anode, means responsive to a reversal of power through an anode for opening the circuit interrupter in series therewith, a common closing mechanism for all of said interrupters, and means responsive to the opening of an interrupter for effecting the operation of said closing mechanism.

4. In combination, a vapor rectifier comprising a plurality of anodes, an individual circuit interrupter in series with each anode, means responsive to a reversal of power through an anode for opening the circuit interrupter in series therewith, a common closing mechanism for all of said interrupters, and means responsive to the opening of an interrupter for effecting the operation of said closing mechanism a predetermined number of times and for opening all of the other circuit interrupters after a circuit interrupter has been reclosed said predetermined number of times.

HERMAN BANY.